United States Patent [19]

Shimada et al.

[11] Patent Number: 4,527,428

[45] Date of Patent: Jul. 9, 1985

[54] SEMICONDUCTOR PRESSURE TRANSDUCER

[75] Inventors: Satoshi Shimada; Kazuji Yamada, both of Hitachi; Seikou Suzuki, Hitachiota; Shigeyuki Kobori, Hitachi; Motohisa Nishihara, Katsuta, all of Japan

[73] Assignee: Hitachi, Ltd., Tokyo, Japan

[21] Appl. No.: 442,665

[22] Filed: Dec. 30, 1982

[51] Int. Cl.³ .............................................. G01L 9/06
[52] U.S. Cl. ........................................ 73/721; 73/706; 73/718; 338/4
[58] Field of Search ................ 73/727, 718, 706, 721, 73/724, DIG. 4; 338/2, 4, 5; 357/40

[56] References Cited

U.S. PATENT DOCUMENTS

| | | | |
|---|---|---|---|
| 3,397,278 | 8/1968 | Pomerantz | 357/40 |
| 3,873,956 | 3/1975 | Kurtz | 338/4 X |
| 3,922,705 | 11/1975 | Yerman | 338/4 X |
| 4,065,971 | 1/1978 | Shimazoe | 73/727 |
| 4,257,274 | 3/1981 | Shimada | 73/718 |
| 4,291,293 | 9/1981 | Yamada | 73/727 X |
| 4,303,903 | 12/1981 | Matsuoka | 338/4 |
| 4,364,276 | 12/1982 | Shimazoe | 73/706 X |
| 4,405,970 | 9/1983 | Swindal | 73/718 X |

Primary Examiner—Donald O. Woodiel
Attorney, Agent, or Firm—Antonelli, Terry & Wands

[57] ABSTRACT

A semiconductor pressure transducer including a measuring diaphragm of semiconductor material for sensing pressure supported by a support member of the same material. An oxide layer and a thin glass layer are interposed between the measuring diaphragm and the support member.

16 Claims, 6 Drawing Figures

SEMICONDUCTOR PRESSURE TRANSDUCER

BACKGROUND OF THE INVENTION (1) Field of the Invention

This invention relates to a semiconductor pressure transducer using a measuring diaphragm of semiconductor material for converting a fluid pressure into an electric signal.

(2) Description of the Prior Art

In one type of measuring diaphragm of semiconductor, such as Si, used for sensing pressure known in the art, the measuring diaphragm includes, as described in U.S. Pat. No. 4,303,903, a central portion of small thickness constituting a distortion generating section and an outer peripheral portion of large thickness and has piezo resistor elements located at the distortion generating section to have changes in resistance sensed. In another type of measuring diaphragm of semiconductor, changes in electrostiatic capacity between it and another fixed electrode are measured, as described in U.S. Pat. No. 4,247,274.

Such measuring diaphragm is mounted on a main body by a support member. In view of the ease with which bonding of the measuring diaphragm to the support member can be effected and also by taking into consideration the need to insulate the measuring diaphragm from the main body, it is considered desirable that the support member should be formed of glass (preferably borosilicate glass to obtain agreement in the coefficient of thermal expansion) and the anodic bonding disclosed in U.S. Pat. No. 3,397,278 should be used to effect bonding.

Meanwhile a measuring diaphragm formed of Si and a support member formed of glass are substantially equal to each other in the coefficient of thermal expansion, but they are distinct from each other in Young's modulus of elasticity. The difference in Young's modulus of elasticity should pose no serious problem when the pressure of a fluid to be measured is relatively low. However, when a line pressure (hydrostatic pressure) of over 100 kg/cm$^2$ is applied, the measuring diaphragm and the support member show a variation in deformation caused by the hydrostatic pressure, so that an output is produced by the hydrostatic pressure and errors tend to occur in the measurements.

SUMMARY OF THE INVENTION

To obviate the aforesaid problem of the prior art, attempts have been made to form a thin layer of glass interposed between the measuring diaphragm and a support member formed of Si so that the support member is essentially formed of Si. However, it has been found that great difficulties are encountered in producing a thin film of uniform thickness on the order of several $\mu$m. Efforts have been made in directly forming a thin layer of glass by sputtering on the measuring diaphragm of Si or the support member of Si but no thin layer of glass of uniform thickness has ever been formed.

Accordingly this invention has as its object the provision of a semiconductor pressure transducer capable of forming a thin film of glass between the measuring diaphragm and the support member with ease which is difficultly influenced by hydrostatic pressure.

The outstanding characteristic of the invention is that the measuring diaphragm and the support member are formed of semiconductor of the same material, such as Si, and a film of oxide is formed on the surface of the measuring diaphragm or support member on which a thin layer of glass is provided by sputtering or chemical vapor deposition (CVD), with the measuring diaphragm being joined to the support member by anodic bondng in such a manner that the thin layer of glass is interposed between them.

Such film of oxide has the function of an insulating layer like glass, and since the main component of glass is $SiO_2$, the film of oxide has good affinity with glass and a thin layer of glass of uniform thickness can be obtained.

DESCRIPTION OF THE PREFERRED EMBODIMENT

Figure 1:
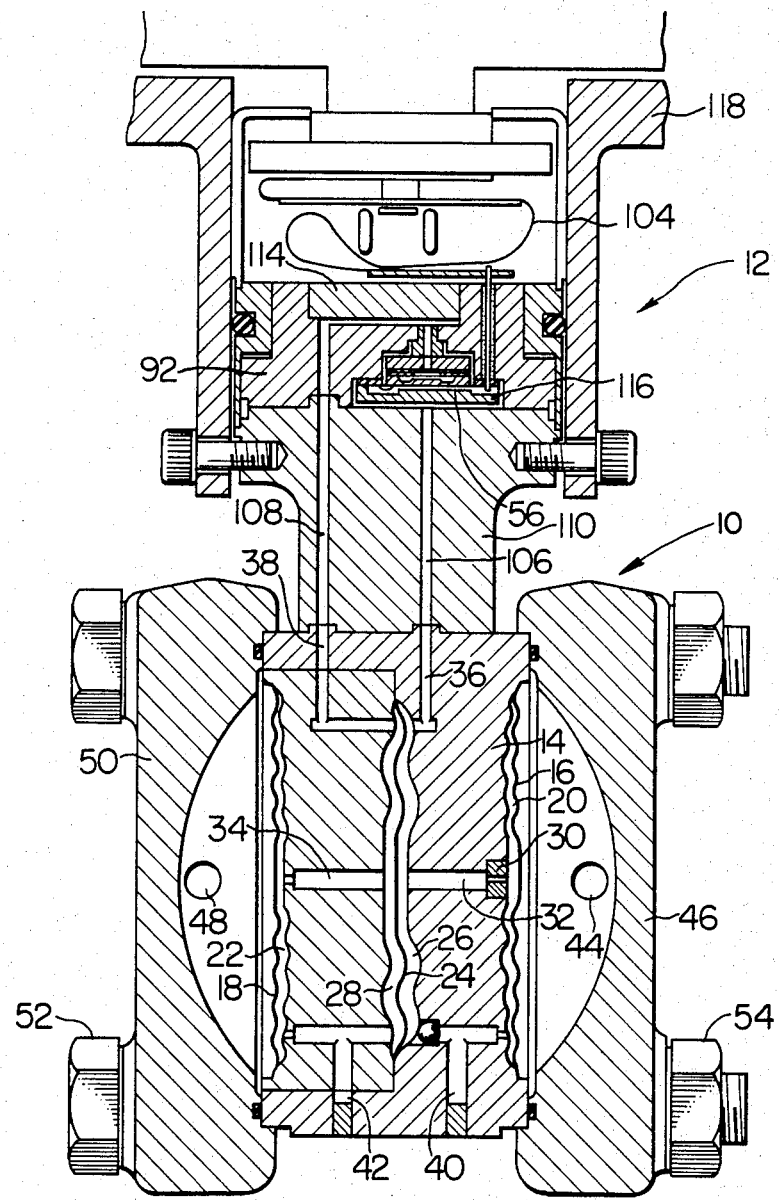
FIG. 1 is a sectional view of the pressure transducer comprising one embodiment of this invention, showing its construction in its entirety.

FIG. 1 is a sectional view of the pressure transducer comprising one embodiment of the invention, showing its construction in its entirety. The pressure transducer comprises a pressure receiving section 10 and a pressure sensing section 12. The pressure receiving section 10 includes a main body 14 having a high pressure side pressure receiving diaphragm 16 and a low pressure side pressure receiving diaphragm 18 of stainless steel which may be Monel metal, hastelloy or tantalum when the fluid handled is highly corrosive joined thereto by welding on its sides, to define a high pressure side pressure receiving chamber 20 and a low pressure side pressure receiving chamber 22 between the pressure receiving section main body 14 and the high pressure side pressure receiving diaphragms 16 and the low pressure side pressure receiving diaphragm 18 respectively. A center diaphragm 24 of stainless steel higher in stiffness than the stainless steel forming the high and low pressure side pressure receiving diaphragms 16 and 18 is joined by welding to the central portion of the pressure receiving section main body 14 to define between it and the pressure receiving section main body 14 a high pressure side separation chamber 26 and a low pressure side separation chamber 28. The high pressure side pressure receiving chamber 20 is maintained in communication with the high pressure side separation chamber 28 through a pressure conduit 32 having a throttle 30, and the low pressure side pressure receiving chamber 22 and the low pressure side separation chamber 28 are maintained in communication with each other through a pressure passageway 34. The pressure receiving section main body 14 is formed with pressure passageways 36 and 38 for communicating the high pressure side separation chamber 26 and low pressure side separation chamber 28 respectively with the pressure sensing section 12, and with ports 40 and 42 for introducing noncompressive liquid, such as silicon oil, therethrough into the pressure receiving section 10 and pressure sensing section 12 to be sealed therein. A high pressure side flange 46 formed with a high pressure fluid inlet port 44 and a low pressure side flange 50 formed with a low pressure fluid inlet port 48 are secured to the pressure receiving section main body 14 by bolts 52 and nuts 54 near four corners at opposite sides thereof in a manner to enclose the high pressure side seal diaphragm 16 and low pressure side seal diaphragm 18.

Figure 2:
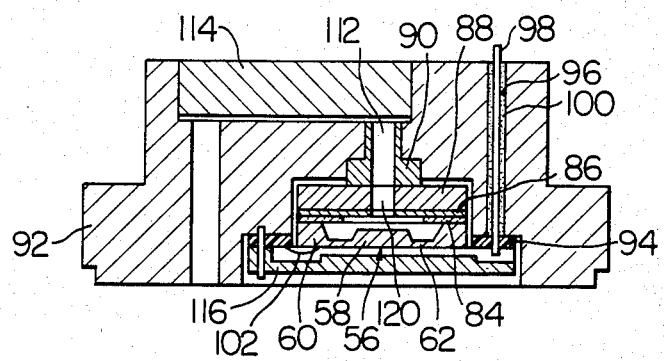
FIG. 2 is a sectional view of the pressure sensing section of the pressure transducer shown in FIG. 1, showing its construction in detail.
Figure 3A:
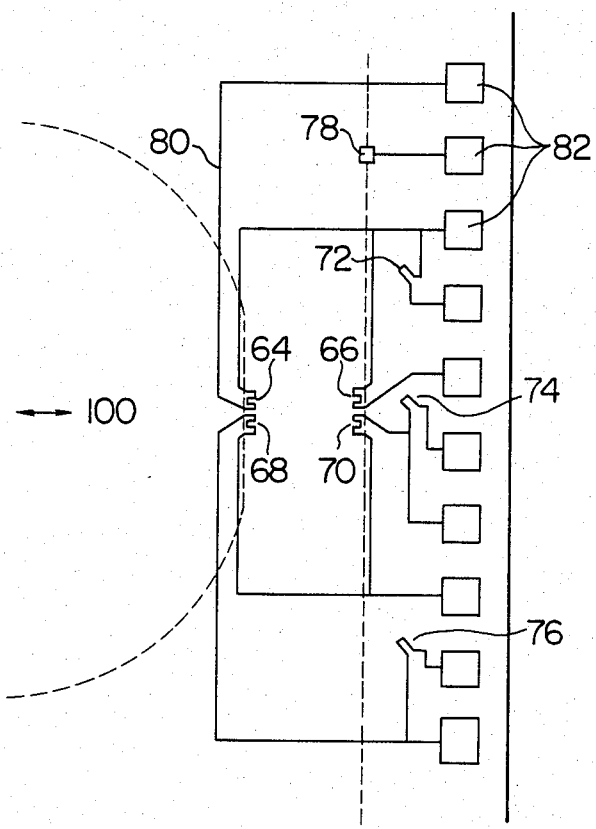
FIG. 3A is a top plan view of the measuring diaphragm, showing some portions thereof in detail.
Figure 3B:
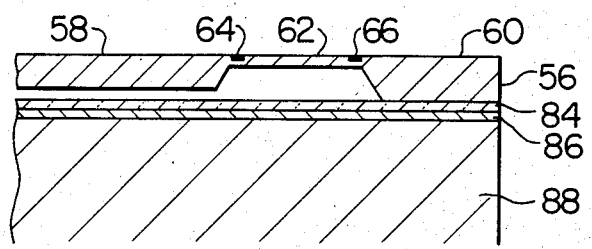
FIG. 3B is a sectional view of the measuring diaphragm shown in FIG. 3A.

The pressure sensing section 12 includes a measuring diaphragm 56 formed of n-type single crystal silicon of {100} face located substantially in the central portion. As shown in FIGS. 2, 3A and 3B, the measuring diaphragm 56 includes a large thickness central portion 58, a large thickness outer peripheral portion 60 and a small thickness portion 62 formed as a groove interposed between the central portion 58 and the outer peripheral portion 60. The large thickness portions 58 and 60 each have a thickness 0.35 mm and the outer peripheral portion is square in shape and has sides in the range between 3 and 9 mm. The small thickness portion 62 has a straight line portion in which P-type piezo resistance elements 64, 66, 68 and 70 are arranged. Anisotropic etching may be relied on by using an alkaline solution, such as KOH, to obtain the small thickness portion 62 of the shape described. The thickness of the small thickness portion 62 may vary depending on the range of the pressure differentials to be measured and output sensitivity, for example. The ratio of the small thickness portion 62 to the outer diameter thereof is of importance from the point of view of obtaining accurate measurements and such ratio should be over 0.5.

The piezo resistance elements 64–70 are formed by selective diffusion of impurities two each on the surface of the measuring diaphragm 60 in the vicinity of the large thickness outer peripheral portion 60 and the large thickness central portion 58 in such a manner that they are in bridge connection. Four sets of such bridge are provided to the surface of the small thickness portion 62 and one of them is selectively used. The piezo resistance elements 64–70 each include four fine series with one another by a low resistance layer in such a manner that they have their <110> axis or their maximum piezo sensitivity axis in the {100} face in alignment with their length. Formed on the surface of the large thickness outer peripheral portion 60 serving as a fixed portion are three temperature sensitive elements 72, 74 and 76 which play an effective role in effecting temperature characteristic compensation when the ranges of the pressure transducer are switched. The temperature sensitive elements 72–76 each include two stringlike members parallel to each other connected in series with each other by a low resistance layer in such a manner that they have their <100> axis of substantially zero piezo sensitivity in alignment with their length. A pad 78 imparts the highest potential to a Si diaphragm base plate to effectively avoid influences which might otherwise be exerted by induced noises. Conductors 80 are formed by vaporization deposition of Al to connect the elements together. An electrode pad 82 is also formed by vaporization deposition of Al.

The measuring diaphragm 56 extends outwardly of a pressure sensing section main body 92 of stainless steel through a first support member 88 having a thin glass layer 84 and an oxide layer 86 and a second support member 90 of metal. The first support member 88 is formed of Si like the measuring diaphragm 56 and the oxide layer 86 thereon has a thickness in the range between 0.1 and 1 $\mu$m. The thin glass layer 84 is formed by sputtering in a thickness ranging from 1 to 5 $\mu$m. The thickness of the thin glass layer 84 is preferably small. However, when it is below 10 $\mu$m, no trouble occurs in practical use. The glass for forming the thin glass layer 84 is preferably borosilicate glass having substantially the same coefficient of thermal expansion ($3.125 \times 10^{-5}/°C.$) as Si. When the thin glass layer 84 is formed by CVD, it is necessary to subject the thin glass layer to heat treatment to obtain hardening thereof. The second support member 90 is formed of Fe-Ni (40%) alloy ($3.6 \times 10^{-6}/°C.$) or Fe-Ni (30%)-Co (17%) alloy ($5.4 \times 10^{-6}/°C.$) having substantially the same coefficient of thermal expansion as Si. The measuring diaphragm 56 is joined to the first support member 88 having the thin glass layer by anodic bonding and the first and second support members 88 and 90 are joined to each other by an organic adhesive agent or Au-Si eutectic alloy while the second support member 90 is joined to the pressure sensing section main body 92 by arc welding.

The oxide layer 86 formed on the first support member 88 ensures that the measuring diaphragm 56 formed of Si is highly insulating. That is, when pinholes develop in the thin glass layer 84 formed on the oxide layer 86, the latter performs the function of insulation and positively performs the function of insulation at elevated temperature. Since the main component of the thin glass layer 84 is $SiO_2$, it has high affinity with the oxide layer 86 and the glass layer 84 can be made uniform in thickness even when the thickness is very small. Thus the measuring diaphragm 56 and the first support member 88 behave as a unit as if they were formed integrally of the same material or Si and are capable of suppressing the production of an output voltage due to hydrostatic pressure.

The pressure sensing section main body 92 includes a printed base plate 94 formed of doughnut-shaped ceramics in such a manner that the printed base plate 94 is substantially flush with the measuring diaphragm 56 and soldered to and supported by conductors 98 extending through a plurality of ducts 96 formed in the pressure sensing section main body 92 on the same circumference in the direction of the center axis. The conductors 98 are supported by a hermetic seal 100 in the ducts 96. The printed base plate 94 is connected to the piezo resistance elements 64–70 by conductors 102, and the conductors 98 supported by the hermetic seal 100 are connected to leads 104. Joined by welding to the pressure receiving section main body 14 is a connecting metal member 110 formed with pressure passageways 106 and 108 which in turn has the pressure sensing section main body 92 joined thereto by welding. The pressure sensing section main body 92 has joined thereto by welding a plate 114 which keeps the pressure passageway 108 in communcation with a pressure passageway 112 formed in the second support member 90. A protective cover 116 for the printed base plate 94 is provided between the measuring diaphragm 56 and the pressure passageway 106. Located above the pressure sensing section 12 and connected thereto via an amplifier section main body case 118 is an amplifier section, not shown.

The high pressure side separation chamber 26 has a larger volume then the high pressure side pressure receiving chamber 20, and the low pressure side separation chamber 28 has a larger volume than the low pressure side pressure receiving chamber 22. By this arrangement, when the high pressure side seal diaphragm 16 or low pressure side seal diphragm 18 is caused by an overload pressure to be seated at the pressure receiving section main body 14, the center diaphragm 24 is prevented from being seated at the pressure receiving section main body 14. Thus the overload pressure is kept from acting on the measuring diaphragm 56, so that deterioration of the characteristics of the measuring diaphragm 56 and damage thereto can be avoided.

Operation of the semiconductor pressure transducer of the aforesaid construction will be described. When a high pressure fluid, such as process fluid, is introduced through the high pressure fluid inlet port 44 at the high pressure side flange 46, the pressure of the high pressure fluid is applied through the high pressure side seal diaphragm 16, pressure passageway 32, high pressure side separation chamber 26 and pressure passageway 36 and 106 to one side surface of the measuring diaphragm 56. When a low pressure fluid is led through the low pressure fluid inlet port 48 at the low pressure side flange 50, the pressure of the low pressure fluid is, like the pressure of the high pressure fluid, applied through the low pressure side seal diaphragm 18, pressure passageway 34, low pressure side separation chamber 28 and pressure passageways 108, 112 and 120 to the other side surface of the measuring diaphragm 56. As a result, the small thickness portions 62 of the measuring diaphragm 56 show a deflection corresponding to the pressure differential and causes the resistance values of the piezo resistance elements 64-70 to show a variation which is transmitted through the conductor 102, printed base plate 94 and conductor 98 to the amplifier section to indicate the pressure differential.

When a pressure is applied to the measuring diaphragm 56, pressures opposed in sign but substantially equal in absolute value are applied to the piezo resistance elements 64 and 68 and 66 and 70. At this time, the rate of change in the resistance shown by the piezo resistance elements 64-70 can be approximated by the following equation:

$$\frac{\Delta R}{R} \simeq \pi_e \sigma_r + \pi_t \sigma_t \qquad (1)$$

where $\pi_e$: the coefficient of vertical piezo resistance (positive);
$\pi_t$: the coefficient of transverse piezo resistance value (negative);
$\sigma_r$: the radial stress; and
$\sigma_t$: the tangential stress.

Thus the resistance elements 64 and 68 and 66 and 70 show changes in resistance opposed in sign and substantially equal in absolute value, thereby providing a bridge output pressure proportional to the pressure differential.

In the embodiment shown and described hereinabove, the formation of the oxide layer 86 and thin glass layer 84 on the first support member 88 enables an increase in the process for working on the measuring diaphragm 56 to be avoided and prevents a process damage that might otherwise be caused to the piezo resistance elements. Also, when the oxide layer and the thin glass layer are formed on the measuring diaphragm 56, the oxide layer can concurrently serve as a mask for etching to be done on the measuring diaphragm 56 and it is mainly the measuring diaphragm that is worked on, so that simplification of the production process can be obtained.

Figure 4:
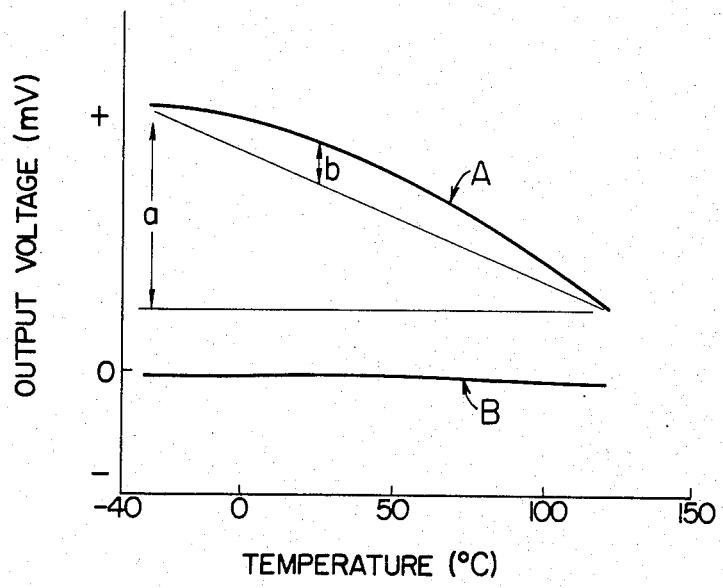
FIG. 4 is a diagram showing the relation between temperature and output voltage.

FIG. 4 is a diagrammatic representation of the results of measuring the temperature characteristic when the bridge is subjected to constant voltage energization. A line A represents the characteristic obtained when the measuring diaphragm of Si of a thickness 0.35 mm is joined to the support member of glass, and a line B indicates the characteristic obtained when the measuring diaphragm is joined to the support member of Si through a thin glass layer. The characteristic represented by the line A has a slope a and a bend b attributed to the difference in the coefficient of thermal expansion between the measuring diaphragm of Si and the support member of glass. The line B shows an ideal temperature characteristic because the material used is Si for both the measuring diaphragm and the support member and the glass layer interposed therebetween only has a thickness of below several $\mu$m.

Figure 5:
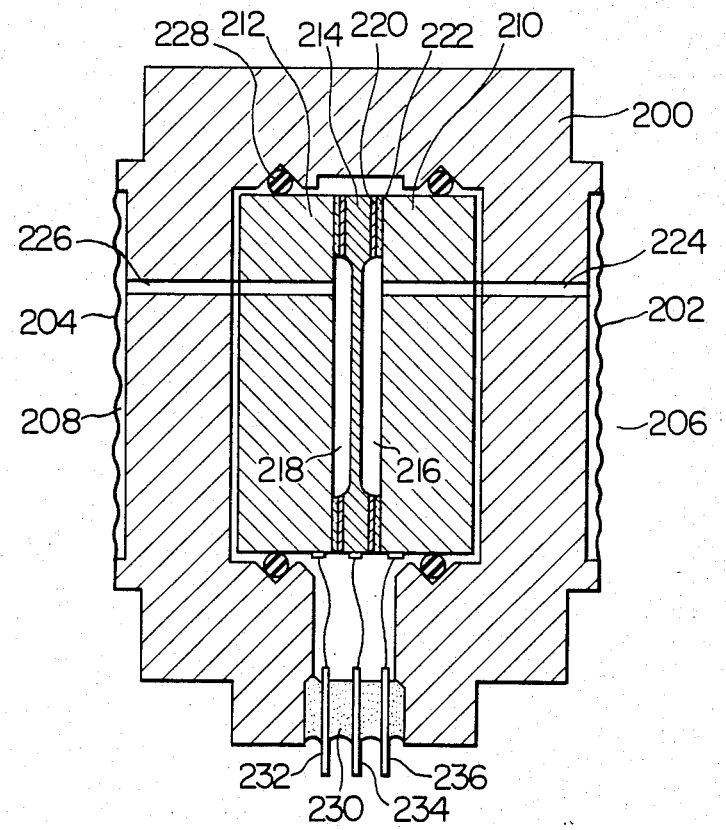
FIG. 5 is a sectional view of the pressure transducer of the electrostatic capacity in which the invention is incorporated, showing the construction thereof in its entirety.

FIG. 5 shows the invention as incorporated in a pressure transducer of the electrostatic capacity. A main body 200 has joined to opposite sides thereof by welding a high pressure side and low pressure side pressure receiving diaphragms 202 and 204 formed of stainless steel which cooperate with the main body 200 to define therebetween high pressure side and low pressure side pressure receiving chambers 206 and 208 respectively. Located in the central portion of the main body 200 is a measuring diaphragm 214 sandwiched by two support members 210 and 212 to define therebetween high pressure side and low pressure side measuring chambers 216 and 218 respectively. The measuring diaphragm 214 and two support members 210 and 212 are formed of the same single crystal silicon and an oxide layer 220 of very small thickness and a thin glass layer 222 are interposed between the measuring diaphragm 214 and the two support members 210 and 212. The high pressure side pressure receiving chamber 206 and the high pressure side measuring chamber 216 are in communication with each other through a pressure passageway 224, and the low pressure side pressure receiving chamber 208 and the low pressure side measuring chamber 218 are in communication with each other through a pressure passageway 226. The high pressure side and low pressure side pressure receiving chambers 206 and 208, measuring chambers 216 and 218, pressure passageways 224 and 226, support members 210 and 212 and main body 200 define a space containing a silicon oil sealed therein, and the high pressure side and the low pressure side are separated from each other by an O-ring 228. The measuring diaphragm 214 supported by the two support members 210 and 212 produces an output which is taken out through conductors 232, 234 and 235 hermetically sealed as indicated at 230 to outside. The pressure transducer shown in FIG. 5 functions such that the measuring diaphragm 214 serves as a movable electrode and the two support members 210 and 212 serve as fixed electrodes. In this pressure transducer, the pressure differential between the pressures of two fluids applied to the high pressure side and low pressure side pressure receiving diaphragms 202 and 204 causes deflection of the measuring diaphragm 214 which is sensed as a change in electrostatic capacity between the two support members 210 and 212 which are fixed electrodes.

From the foregoing description, it will be appreciated that according to the invention a glass layer interposed between the measuring diaphragm and its support member is formed on an oxide layer. This feature enables a thin glass layer of uniform thickness to be obtained and allows a pressure transducer to be produced which is impervious to the influences exerted by hydrostatic pressure and changes in temperature.

What is claimed is:

1. A semiconductor pressure transducer comprising:
    a measuring diaphragm formed of semiconductor material;
    a support member formed of semiconductor material for supporting said measuring diaphragm;
    an oxide layer having a high affinity to glass and a thin glass layer interposed between said measuring diaphragm and said support member, said oxide layer enabling said thin glass layer of uniform thickness to be formed, said measuring diaphragm and said support member being joined to each other by anodic bonding through said thin glass layer;
    a main body on which said support member is mounted; and
    means located in said main body for applying pressures of fluids to be measured to said measuring diaphragm.

2. A semiconductor pressure transducer as claimed in claim 1, wherein said oxide layer is located on said support member.

3. A semiconductor pressure transducer as claimed in claim 2, wherein said thin glass layer is located on said oxide layer.

4. A semiconductor pressure transducer as claimed in claim 3, wherein said thin glass layer is formed by sputtering.

5. A semiconductor pressure transducer as claimed in claim 3, wherein said thin glass layer has a thickness below 10 μm.

6. A semiconductor pressure transducer as claimed in claim 1, wherein said support member and said measuring diaphragm are made of the same semiconductor material.

7. A semiconductor pressure transducer as claimed in claim 6, wherein said same semiconductor material is silicon.

8. A semiconductor pressure transducer as claimed in claim 7, wherein the thin glass layer is of a borosilicate glass.

9. A semiconductor pressure transducer as claimed in claim 1, wherein the oxide layer is located on the measuring diaphragm.

10. A semiconductor pressure transducer as claimed in claim 1, wherein said oxide layer has a thickness in the range between 0.1 and 1 μm.

11. A semiconductor pressure transducer comprising:
    a pressure sensing section main body having introduced thereinto two fluids of different pressures to be measured;
    a measuring diaphragm of semiconductor material, provided in said pressure sensing section main body, including a large thickness portion, a small thickness portion formed with piezo resistance elements located outside said large thickness portion and a fixed portion of large thickness located outside said small thickness portion;
    a support member of semiconductor material joined to said fixed portion of said measuring diaphragm through an oxide layer having a high affinity to glass and a thin glass layer by anodic bonding, said oxide layer enabling said thin glass layer of uniform thickness to be achieved;
    pressure passageways for fluids formed in said support member; and
    means for applying pressures of said two fluids to be measured to opposite side surfaces of said measuring diaphragm.

12. A semiconductor pressure transducer as claimed in claim 11, wherein the crystal surface of said measuring diaphragm is a {100} surface and said piezo resistance elements are arranged parallel to a <110> axis.

13. A semiconductor pressure transducer as claimed in claim 11, further comprising a support member of metal interposed between said support member and said main body.

14. A semiconductor pressure transducer as claimed in claim 13 wherein said support member of metal is formed of an alloy selected from the group consisting of an Fe-Ni alloy and an Fe-Ni-Co alloy.

15. A semiconductor pressure transducer comprising:
    a pressure receiving section main body;
    two seal diaphragms each located on either side of said pressure receiving section main body for defining a high pressure fluid receiving chamber and a low pressure fluid receiving chamber;
    a center diaphragm arranged in said pressure receiving section main body to define two separation chambers each communicating with one of said pressure receiving chambers;
    a measuring diaphragm of semiconductor material formed with piezo resistance elements on one surface thereof and formed with a large thickness central portion, a large thickness outer peripheral portion and a small thickness portion interposed between said central portion and said outer peripheral portion;
    a support member of semiconductor material having a pressure passageway connected at one end to a peripheral portion of the other surface of said measuring diaphragm by anodic bonding through a thin glass layer and an oxide layer having a high affinity to glass, said oxide layer enabling said thin glass layer of uniform thickness to be obtained;
    a support member of metal having a pressure passageway connected at one end to the other end of said support member of semiconductor material and communicated with said pressure passageway of said support member of semiconductor material;
    a pressure sensing section main body connected to the other end of said connecting member of metal;
    a connecting metal member having a first pressure passageway communicating said the other surface of said measuring diaphragm with one of said pressure receiving chambers through the support members of semiconductor material and metal, and a second pressure passageway communicating said one surface of said measuring diaphragm with the other pressure receiving chamber; and
    a noncompressive fluid sealed in said pressure receiving chambers, separation chambers and first and second pressure passageways.

16. A semiconductor pressure transducer comprising:
    a measuring diaphragm of semiconductor material;
    a support member of semiconductor material cooperating with said measuring diaphragm to define measuring chambers therebetween;
    an oxide layer having a high affinity to glass and a thin glass layer interposed between said measuring diaphragm and support member, said support member being joined to said measuring diaphragm by anodic bonding, said oxide layer enabling said thin glass layer of uniform thickness to be obtained;

a main body having said support member mounted thereon;

pressure passageways formed in said main body for leading fluids to be measured to said measuring chambers; and means for sensing changes in electrostatic capacity between said measuring diaphragm and said support member.

* * * * *